(12) United States Patent
Wang et al.

(10) Patent No.: US 8,229,655 B2
(45) Date of Patent: Jul. 24, 2012

(54) FUEL INJECTION AND COMBUSTION FAULT DIAGNOSTICS USING CYLINDER PRESSURE SENSOR

(75) Inventors: Yue-Yun Wang, Troy, MI (US); Ibrahim Haskara, Macomb, MI (US); Chol-Bum M. Kweon, Rochester, MI (US); Frederic Anton Matekunas, Troy, MI (US); Paul Anthony Battiston, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 690 days.

(21) Appl. No.: 12/468,264

(22) Filed: May 19, 2009

(65) Prior Publication Data

US 2010/0299051 A1    Nov. 25, 2010

(51) Int. Cl.
*G06F 19/00* (2006.01)
*G06F 11/30* (2006.01)
*G01M 15/00* (2006.01)

(52) U.S. Cl. ............ 701/111; 73/114.16; 702/183; 701/114

(58) Field of Classification Search .......... 701/101–105, 701/111, 114, 115; 123/406.22–406.24, 123/435, 436, 479; 73/35.03–35.06, 114.03, 73/114.04, 114.11, 114.16, 114.22; 702/182–185
See application file for complete search history.

(56) References Cited

U.S. PATENT DOCUMENTS

| | | | | |
|---|---|---|---|---|
| 5,668,725 A | * | 9/1997 | Naik | 701/111 |
| 5,719,330 A | * | 2/1998 | Carr et al. | 73/114.62 |
| 6,483,311 B1 | * | 11/2002 | Ketterer et al. | 73/35.05 |
| 7,779,678 B2 | * | 8/2010 | Wolber et al. | 73/114.45 |

* cited by examiner

*Primary Examiner* — Willis Wolfe, Jr.

(57) ABSTRACT

Systems and methods useful for detecting a combustion fault in a combustion engine include determining cylinder power density values for cylinders present on the engine during its operation and determining cylinder imbalance parameters for the cylinders, based on the cylinder power density values. The cylinder imbalance parameters are compared with a provided diagnostic threshold value.

17 Claims, 3 Drawing Sheets

FUEL INJECTION AND COMBUSTION FAULT DIAGNOSTICS USING CYLINDER PRESSURE SENSOR

TECHNICAL FIELD

This disclosure is generally related to the operation of combustion engines, and more particularly to combustion fault diagnosis.

BACKGROUND OF THE DISCLOSURE

The statements in this section merely provide background information related to the present disclosure and may not constitute prior art.

Modern combustion engines are often equipped with microprocessor-based controller and sensors to monitor and beneficially alter operational parameters over time. Exemplary of such systems in general are those which control parameters that affect fuel combustion, including ignition timing, fuel injection mass and timing, exhaust gas recirculation, and engine cooling, among others.

In general terms, for a given engine r.p.m. or range of engine r.p.m's, a particular combination or range of values or settings for the many parameters under control provides the most desirable operation of an engine, as pre-determined by an engineer or other person on a basis that may include fuel economy, emissions, power output, or any other selected criteria. Once criteria are established, an engine may be commanded to operate to provide a desired operation. However, owing to changes in engine system components over time, or other factors, an engine may experience undesirable performance including undesirable combustion results (e.g. misfires or partial burns).

SUMMARY OF THE DISCLOSURE

Systems and methods useful for detecting a combustion fault in a combustion engine include determining cylinder power density values for cylinders present on the engine during its operation and determining cylinder imbalance parameters for the cylinders, based on the cylinder power density values. The cylinder imbalance parameters are compared with a provided diagnostic threshold value.

BRIEF DESCRIPTION OF THE DRAWINGS

One or more embodiments will now be described, by way of example, with reference to the accompanying drawings, in which.

DESCRIPTION OF THE PREFERRED EMBODIMENT

The present disclosure provides methods and systems useful for determining a combustion fault in one or more cylinders present on an operating combustion engine. In a first embodiment, cylinder power density is determined at various points in real time during operation of the engine, by calculating a pressure ratio PR, through use of the following relation:

$$PR(\theta) = \frac{P_{cyl}(\theta)}{P_{mot}(\theta)} \quad [1]$$

wherein θ represents the angular position of the engine's crankshaft in degrees,
$P_{cyl}$ represents the cylinder pressure, and
$P_{mot}$ represents the cylinder motoring pressure.
$P_{mot}$ itself is provided by the following relation:

$$P_{mot}(\theta) = P_{in}(V_{in}/V(\theta))^r \quad [2]$$

wherein $P_{in}$ represents a sampled cylinder pressure at a pre-specified crankangle prior to combustion (or an equivalent of it such as intake manifold pressure at intake valve closing,
$V_{in}$ represents the cylinder volume at that particular crankangle, and
r is the ratio of specific heats.

Figure 1:
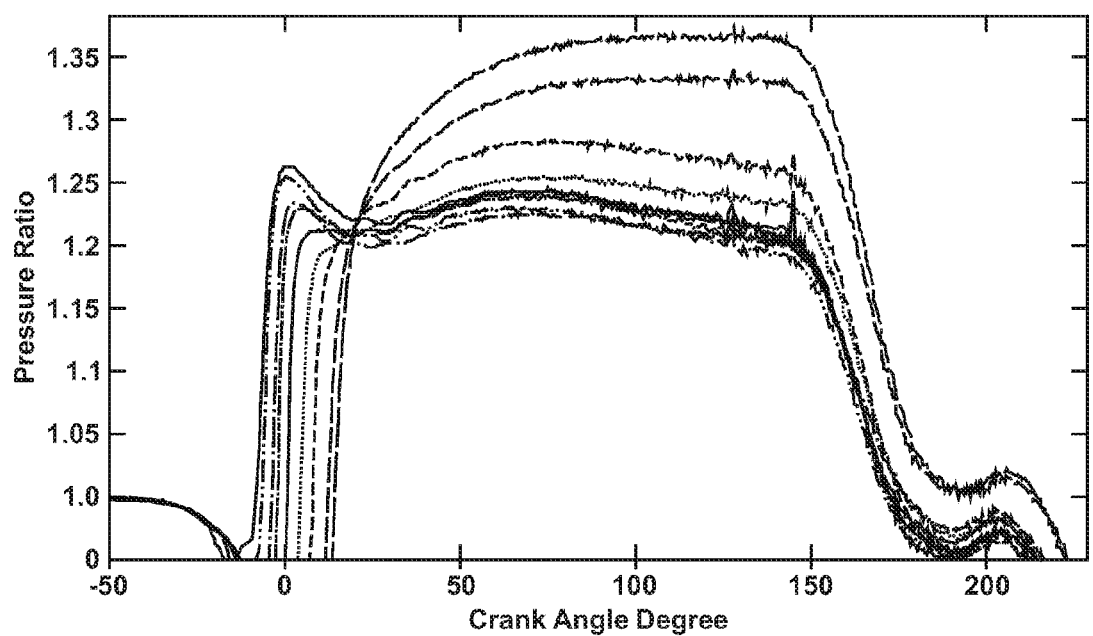
FIG. 1 illustrates exemplary pressure ratios as a function of crankangle θ for varied fuel injection timings, in accordance with the present disclosure.

Having defined these relations, it is now possible to provide the graphical representation shown in FIG. 1, illustrating exemplary pressure ratios PR as a function of crankangle θ for varied fuel injection timings.

In one embodiment, the cylinder power density (W) within the time domain for each engine cylinder, ($W_i$), is provided by the following relation:

$$W_i = \frac{1}{N}\sqrt{\sum_{\theta=\theta_1}^{\theta=\theta_2}(PR)^2(\theta)} \quad [3]$$

for i=1, 2, ... n, the subscript or index i in $W_i$ representing a cylinder, n being the number of cylinders, and N being the number of sampled PR points. This makes $W_i$ the root mean square of PR trace at the crankangle range that PR is sampled. Once the cylinder power density ($W_i$) has been determined for each cylinder, this information is useful for providing a cylinder imbalance index comprising cylinder imbalance parameters or values, as will be described.

In an alternate embodiment, cylinder power density is determinable using a power spectrum of Pressure Ratio (PR) for an operating combustion engine, calculated in the domain of frequency, such as by use of equation [4] as follows:

$$P(\omega) = FFT(PR(10°, 120°)) \quad [4]$$

wherein P(ω) represents the PR in frequency domain with ω being the frequency,
FFT (Fast Fourier Transform) represents the operation to compute the frequency spectrum, and
(PR(10°, 120°)) is the sampled/computed PR trace between the crankangles 10° and 120°, selected for illustrative purposes only in this non-limiting example of start and stop crankangles.

Figure 2:
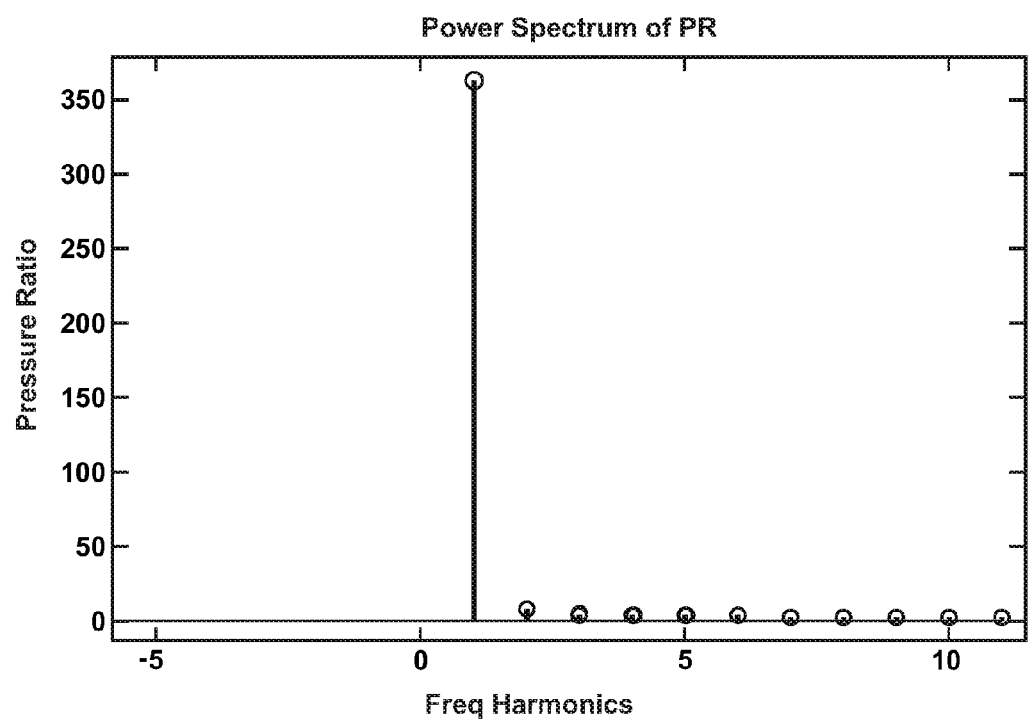
FIG. 2 illustrates one exemplary power spectrum of pressure ratio, showing power as a function of frequency harmonics, in accordance with the present disclosure.

FIG. 2 illustrates one exemplary power spectrum of PR, showing power as a function of frequency harmonics. An expression for the cylinder power density $W_i$ for each cylinder i present may be developed in the following form:

$$W_i = |P(\omega_1)| + |P(\omega_2)| + |P(\omega_3)| + \ldots |P(\omega_m)| \quad [5]$$

wherein each $\omega_i$ represents pre-specified frequencies or harmonics up to the number of cylinders m, which expression is useful in defining a cylinder imbalance index, as will be described. Thus, in different embodiments cylinder power density can be determined from pressure ratios in either a time domain or a frequency domain. Acquiring by suitable sensors disposed on an engine or otherwise providing data for cylinder power density enables definition of cylinder imbalance parameters that may be compared against a pre-selected diagnostic threshold to indicate the presence of conditions of cylinder combustion fault. In some embodiments a fault may be indicated when the cylinder imbalance parameters differ from the diagnostic threshold by a predetermined amount, which may be zero or any non-zero number effective to indicate a combustion fault. An indication of a combustion fault may take the form of a visual signal, an audible signal, or any other form generally known or recognized in the art associated with the indication, identification, or alerting of a person or an electronic system of events or parameters relating to combustion engine operation, including the setting of a diagnostic code in an on-board diagnostic system.

In alternate embodiments, the heat released by individual cylinders at the end of a combustion cycle is determined, by means of at least one suitable effective temperature or pressure sensor, and the power density $W_i$ is determined by equating it to the net heat release. When a pressure sensor is employed, the rate of heat release for a given cylinder in an engine is provided by the following equation:

$$\frac{dQ_{ch}}{d\theta} = \frac{r}{r-1} p \frac{dV}{d\theta} + \frac{1}{r-1} V \frac{dp}{d\theta} + \frac{dQ_{ht}}{d\theta} \quad [6]$$

wherein $\theta$ represents crankangle, $Q_{ch}$ represents heat released from the cylinder charge as a function of crankangle, r represents the ratio of specific heats, $$\frac{dV}{d\theta}$$

represents cylinder volume change rate over crankangle, p represents the cylinder pressure, and $Q_{ht}$ is the heat loss as a function of crank angle.

The heat released by a cylinder as a result of a combustion cycle is related to the quantity of fuel injected into the cylinder as set forth in the following equation:

$$m_f = \frac{Q_{ch}}{\alpha \cdot Q_{LHV}} \quad [7]$$

wherein $m_f$ represents the mass of fuel injected, $Q_{LHV}$ is the lower heating value of the fuel, and $\alpha$ is a constant that is related to combustion efficiency of the engine under consideration.

Neglecting heat transfer, the net heat release, or power density is given by the following equation.

$$W_i = \int \frac{r}{r-1} p \frac{dV}{d\theta} + \frac{1}{r-1} V \frac{dp}{d\theta} \quad [8]$$

Power density may alternately be determined using a discrete time version of the heat-release equation as follows:

$$W_i = \sum P_{k+1} - P_k \left(\frac{V_k}{V_{k+1}}\right)^r \quad [9]$$

wherein k is the crankangle index, $P_k$ represents the cylinder pressure at the crankangle k, $V_k$ represents the cylinder volume at the crankangle k.

Thus, the amount of injected fuel that is burned during combustion is directly related to the power density ($W_i$) by equating or substantially equating it to the net heat release from combustion.

Having provided methods for determining power density ($W_i$) from the cylinders of a combustion engine, a method according to some embodiments of the disclosure includes defining a Cylinder Imbalance Index, which contains a plurality of numerical values derived using ratios of power densities ($W_i$) for various cylinders present on an operating combustion engine. A Cylinder Imbalance Index thus includes a collection of cylinder power imbalance parameters, which reflect real-time comparisons of combustion properties of the various engine cylinders relative to one another. In one preferred embodiment a definition of a Cylinder Imbalance Index is provided by the following expressions:

$$\overline{B}_1 = 1 - \frac{W_2}{W_1}, \overline{B}_2 = 1 - \frac{W_3}{W_2}, \ldots, \quad [10]$$
$$\overline{B}_i = 1 - \frac{W_{i+1}}{W_i}, \ldots, \overline{B}_n = 1 - \frac{W_1}{W_n},$$

and $$\hat{B}_1 = 1 - \frac{W_3}{W_1}, \hat{B}_2 = 1 - \frac{W_4}{W_2}, \ldots, \quad [11]$$
$$\hat{B}_i = 1 - \frac{W_{i+2}}{W_i}, \ldots, \hat{B}_n = 1 - \frac{W_2}{W_n},$$

in which the $\overline{B}$ series of values represent numerical values equal to 1 minus the ratio of the power densities of the two subsequent cylinders following each other in the firing order, the cylinder indices capable of being optionally arranged as the firing order. The $\hat{B}$ series of values represent numerical values equal to 1 minus the ratio of the power densities of every other cylinder in terms of the firing order.

Once created, data comprising a Cylinder Imbalance Index that includes numerical values relating to the power densities of cylinders present, which in one embodiment is all cylinders present, on a combustion engine relative to one another may be stored on-board a motorized vehicle or other manufacture that comprises a combustion engine, such as in an on-board controller, including computer memory operatively connected thereto.

Figure 3:
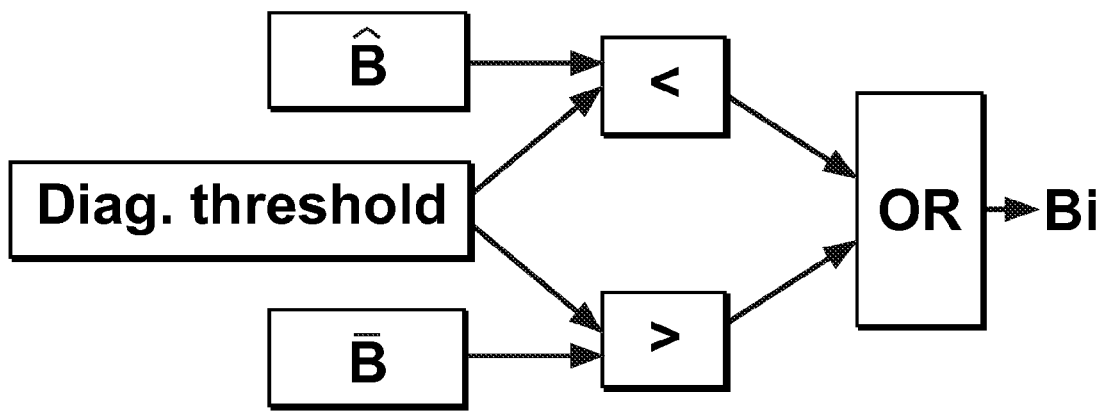
FIG. 3 shows a logic scheme useful, in accordance with the present disclosure.

In one embodiment, at least one pre-determined diagnostic threshold value is provided as an input to a controller having inputs that include pressure-sensing or effective thermal sensors for providing combustion heat release data, and repeatedly iterates determinations of values present in the Cylinder Imbalance Index over time. The values present in Cylinder Imbalance Indices so generated are compared to the diagnostic threshold provided, and a combustion fault is indicated when a value in the Cylinder Imbalance Index exceeds the diagnostic threshold provided. In a preferred embodiment, the sensors inputted to the controller are pressure sensors configured to sense cylinder pressure. A logic scheme useful in accordance with the foregoing description is depicted in FIG. 3.

Figure 4:
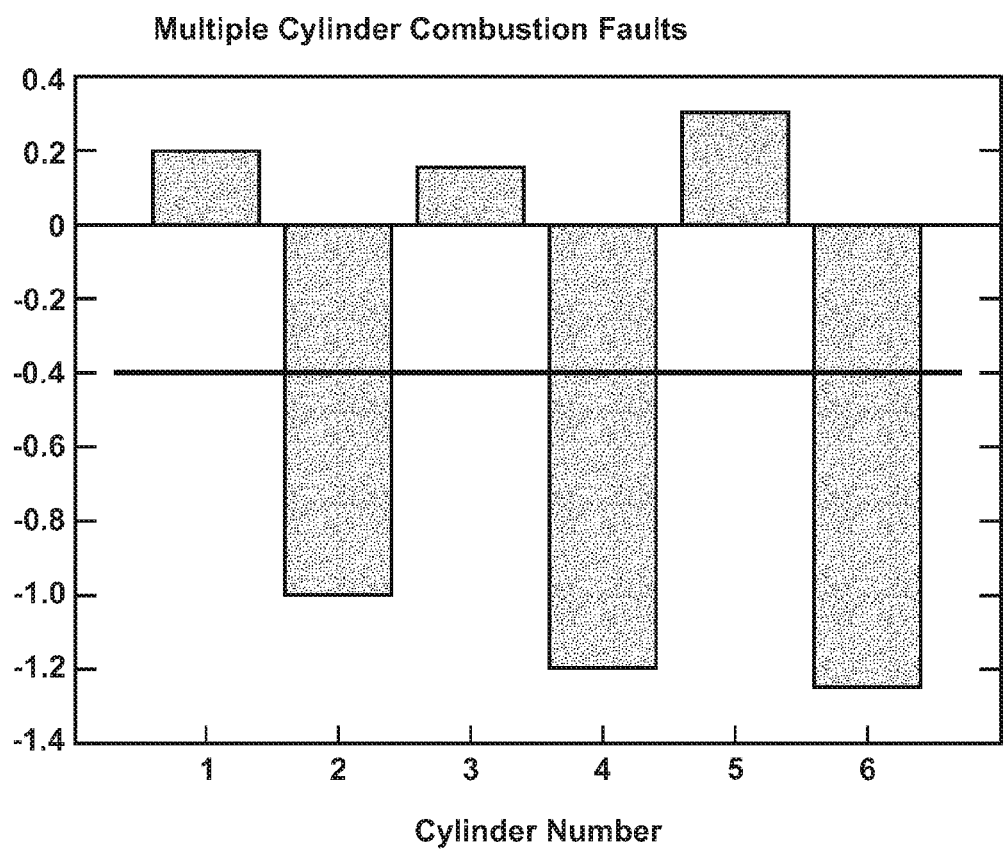
FIG. 4 illustrates a potential output for an operating 6-cylinder combustion engine, in accordance with the present disclosure.

FIG. 4 shows one potential output for an operating 6-cylinder combustion engine to which a method according to this disclosure has been applied, wherein the diagnostic threshold relating to net heat output was prescribed as having a value of −0.4. From FIG. 4 it is seen that the measured performance for cylinders 2, 4, and 6 is outside the diagnostic threshold, and for such an outcome, a combustion fault condition would be indicated for these cylinders. Such a combustion fault condition may arise as a result of a fuel injector error, when fuel injectors are present, which may related to injector timing or quantity of fuel delivered. Other conditions which may cause a combustion fault to be indicated include partial burning of the fuel charge, cylinder compression characteristics, and engine mis-fires; however, any undesirable or anomalous occurrence affecting combustion may be indicated, provided that the diagnostic threshold is appropriately pre-selected.

Figure 5:
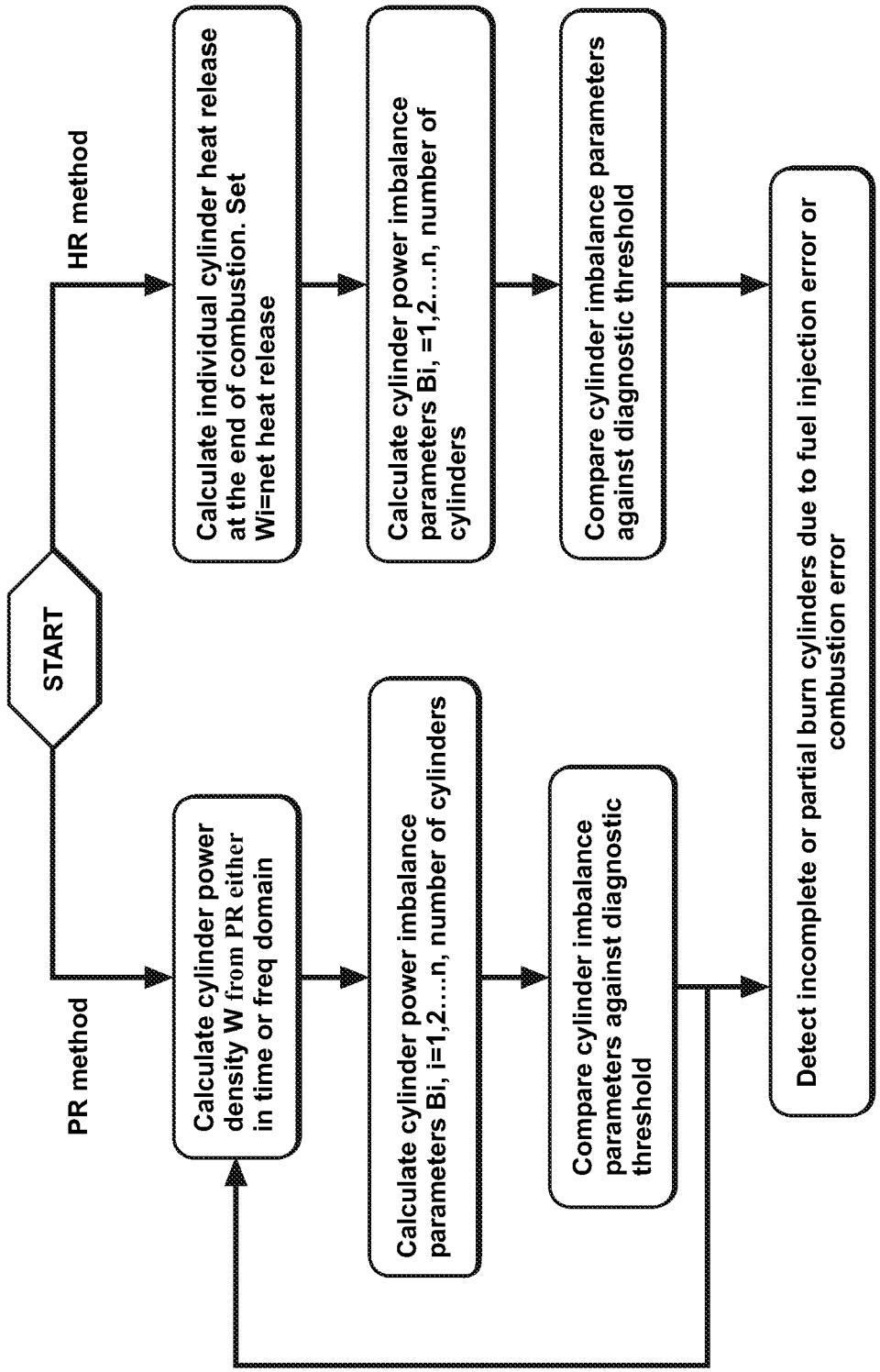
FIG. 5 provides a flow chart illustrating methodologies useful for detecting a combustion fault, in accordance with the present disclosure.

FIG. 5 provides a flow chart illustrating methodologies useful for detecting a combustion fault for some embodiments of the disclosure.

Methods and calculations useful for determining a combustion fault in a combustion engine described herein may be advantageously carried out using a controller or other computing aids. In preferred embodiments, controllers are chosen which are configured to receive inputs from at least one sensor disposed in an effective-sensing location on a combustion engine, to provide information concerning cylinder pressure or effective indication of heat produced in cylinders of a combustion engine. The controller may itself comprise computer memory, or may be operatively connected to an external memory source. In any event, the controller when operated according to the disclosure causes determination of cylinder power imbalance parameters, which may be considered as members of a Cylinder Imbalance Index. The controller is also provided with a pre-selected diagnostic threshold. In some embodiments, the diagnostic threshold may comprise two thresholds, one being an upper threshold and one being a lower threshold. The controller is further configured to make comparisons of the power imbalance parameters to a diagnostic threshold, and to indicate the presence of a combustion fault when a power imbalance parameter has a value in excess of the limitation effectively created by the presence of the diagnostic threshold. Use of a controller in this regard enables a process as described above to be carried out in repeated iterations, which may be successive iterations.

In preferred embodiments, a combustion engine having a system described herein, or which uses a method as described herein, or both, is disposed on a motorized vehicle. Suitable motorized vehicles include without limitation conventional motorized vehicles, such as trucks, automobiles, earth-moving equipment, aircraft, and sea-going vessels. In one preferred embodiment, the combustion engine is a diesel engine. For cases involving combustion engines disposed on motorized vehicles, the controller is preferably disposed on-board the motorized vehicle; however, the present disclosure also includes embodiments where the data outputted from a sensor disposed on the engine is relayed, such as by wireless transmission, to a receiving station, which may be a station remotely located from the motorized vehicle that manages and monitors the activity of a fleet of vehicles. In such embodiments, it is possible for an operator at the remote station to monitor for combustion faults from a large number of vehicles simultaneously.

While the disclosure has been described by reference to certain embodiments, it should be understood that changes can be made within the spirit and scope of the inventive concepts described. Accordingly, it is intended that the disclosure not be limited to the disclosed embodiments, but that it have the full scope permitted by the language of the following claims

The invention claimed is:

1. Method useful for detecting a combustion fault in a combustion engine, comprising:
   determining cylinder power density values for cylinders present on said engine during its operation;
   determining cylinder imbalance parameters for said cylinders, based on said cylinder power density values;
   providing a diagnostic threshold value;
   comparing said cylinder imbalance parameters with said diagnostic threshold value.

2. The method according to claim 1 wherein said cylinder power density values are determined based on the output of a sensor selected from the group consisting of: pressure sensors and thermal sensors.

3. The method according to claim 1 wherein said cylinder power density values are determined using a pressure ratio in a time domain.

4. The method according to claim 1 wherein said cylinder power density values are determined using a pressure ratio in a frequency domain.

5. The method according to claim 1 wherein said cylinder power density values are determined by first substantially determining individual cylinder heat release and subsequently substantially equating cylinder power density to said cylinder heat release.

6. The method according to claim 1, further comprising:
   indicating a combustion fault, when at least one cylinder imbalance parameter has a value which exceeds said diagnostic threshold value.

7. The method according to claim 6, wherein said combustion fault is a combustion fault that occurred in a single engine cylinder.

8. The method according to claim 6 wherein said engine is disposed in a motorized vehicle, and said indicating comprises setting a diagnostic code in an on-board diagnostic system.

9. The method according to claim 6 wherein said engine is disposed in a motorized vehicle and wherein at least one of said cylinder power density values, said cylinder imbalance parameters, and said combustion fault are conveyed wirelessly to a remote monitoring station.

10. System for detecting a combustion fault in an operating combustion engine, comprising:
    an internal combustion engine having a plurality of cylinders;
    at least one sensor disposed in effective sensing proximity to said engine sufficient to generate an output responsive to an operational characteristic of said engine during its operation; and
    a controller configured to
    receive the output from said at least one sensor as an input,
    calculate cylinder power density values for the cylinders based on the output of said at least one sensor,
    determine cylinder power imbalance parameters based on said cylinder power density values, and
    compare said cylinder imbalance parameters to a predetermined diagnostic threshold.

11. The system according to claim 10 wherein said operational characteristic is a cylinder pressure.

12. The system according to claim 10 wherein said cylinder power density values are determined using a cylinder pressure ratio in a time domain.

13. The system according to claim 10 wherein said cylinder power density values are determined using a cylinder pressure ratio in a frequency domain.

14. The system according to claim 10 wherein said cylinder power density values are determined by first substantially determining individual cylinder heat release and subsequently substantially equating cylinder power density to said cylinder heat release.

15. The system according to claim 10, further comprising a wireless transmitter configured to receive information from said controller and transmit said information wirelessly to a remote receiving station.

16. The system according to claim 10, said controller further configured to indicate a combustion fault when a cylinder imbalance parameter differs from said diagnostic threshold by a predetermined amount.

17. The system according to claim 16, said controller being further configured to set a diagnostic code in a diagnostic system associated with operation of said engine.

* * * * *